US007831041B2

(12) United States Patent
Tanaka

(10) Patent No.: US 7,831,041 B2
(45) Date of Patent: Nov. 9, 2010

(54) IMAGE FORMING APPARATUS AND IMAGE FORMING SYSTEM

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 901 days.

(21) Appl. No.: 11/724,347

(22) Filed: Mar. 15, 2007

(65) Prior Publication Data

US 2007/0269042 A1 Nov. 22, 2007

(30) Foreign Application Priority Data

May 17, 2006 (JP) ............................ 2006-138064

(51) Int. Cl.
*H04L 9/00* (2006.01)

(52) U.S. Cl. ........................................................ 380/44

(58) Field of Classification Search .................. 380/44, 380/52; 713/184

See application file for complete search history.

(56) References Cited

U.S. PATENT DOCUMENTS

2003/0018900 A1* 1/2003 Endoh ........................ 713/182
2005/0210259 A1 9/2005 Richardson
2006/0031674 A1* 2/2006 Sakurai ...................... 713/166
2006/0250644 A1* 11/2006 Yamauchi et al. .......... 358/1.15

FOREIGN PATENT DOCUMENTS

JP 9-139848 5/1997
JP 2005-86697 3/2005
JP 2005-295541 10/2005

OTHER PUBLICATIONS

Kyoritsu Shuppan Co., Ltd.—Key Distribution—vol. 23, No. 12, 2006.

* cited by examiner

*Primary Examiner*—Ellen Tran
(74) *Attorney, Agent, or Firm*—Gerald E. Hespos; Michael J. Porco

(57) ABSTRACT

An image forming apparatus includes a reader for reading image data from a document. An inherent information storage stores information inherent to the image forming apparatus. An encryption key generator generates an encryption key based on the inherent information in the inherent information storage, and an encryptor encrypts the image data read by the reader based on the encryption key to generate encryption data. An acceptor accepts an image formation designation to form an image on a recording sheet. A decryption key generator generates a decryption key based on the inherent information in the inherent information storage if the image formation designation is accepted by the acceptor. A decryptor decrypts the encryption data based on the decryption key to acquire the image data, and an image forming section forms the image on the recording sheet based on the data acquired by the decryptor.

7 Claims, 4 Drawing Sheets

IMAGE FORMING APPARATUS AND IMAGE FORMING SYSTEM

BACKGROUND OF THE INVENTION

1. Field of the Invention

The present invention relates to an image forming apparatus and an image forming system for encrypting image data read from a document.

2. Description of the Related Art

In recent years, information technology (IT) has progressed in business organizations, governments, municipal institutes, or like institutes. Information sharing, reduction of administration fees, and a like advantage have been provided by computerizing paper documents. In the technical field of image forming apparatuses such as copiers, digitization has also progressed. There have been known image forming apparatuses, in which document images are acquired as electronic data, and image data read from documents is stored in an HDD (hard disk drive) or a storage medium such as a detachable memory card. Further, complex machines having functions as a scanner, a printer, a facsimile machine, or a like device, in addition to the function of a copier, have been widespread, and document computerization with use of the complex machines has been encouraged.

As the document computerization has progressed, it is highly likely that the computerized information may be carried out of the institutes such as offices administering the documents. This may increase likelihood that classified information may be leaked. In view of this, there are proposed image forming apparatuses constructed such that: access to computerized classified document data is restricted by a password; computerized classified document data is encrypted; or a predetermined password entry is required in forming an image of an encrypted classified document, and image output is authorized exclusively when a right password is entered (e.g. see Japanese Unexamined Patent Publication No. 2005-295541).

In the image forming apparatus requiring the password entry in forming an image of a classified document, or in the image forming apparatus constructed such that classified document data is encrypted for storage, the following drawbacks may be involved. For instance, in the case where a password is known to a third party when a user enters the password to the image forming apparatus, or an encryption key is leaked, the classified document may be read, and a storage medium storing the image data of the classified document may be carried outside the institute administering the classified document, or the HDD storing the image data of the classified document may be carried outside the institute by maintenance or a like service. In such a condition, it is possible for an unauthorized person to acquire the classified document data, using the password known to the third party or the encryption key, from the storage device such as the HDD or the storage medium which has been carried outside the institute. This may cause leak of the classified information.

SUMMARY OF THE INVENTION

In view of the above problems residing in the prior art, it is an object of the invention to provide an image forming apparatus and an image forming system that enable to suppress leak of image data acquired from a document.

An image forming apparatus according to an aspect of the invention comprises: an image reader for reading image data from a document; an inherent information storage for storing inherent information inherent to the image forming apparatus in advance; an encryption key generator for generating an encryption key based on the inherent information stored in the inherent information storage; an encryptor for encrypting the image data read by the image reader based on the encryption key generated by the encryption key generator to generate encryption data; an acceptor for accepting an image formation designation to form an image on a recording sheet; a decryption key generator for generating a decryption key based on the inherent information stored in the inherent information storage if the image formation designation is accepted by the acceptor; a decryptor for decrypting the encryption data based on the decryption key generated by the decryption key generator to acquire the image data; and an image forming section for forming the image on the recording sheet based on the image data acquired by the decryptor.

In the above-mentioned image forming apparatus, the image reader reads the image data from the document, and the encryption key generator generates the encryption key based on the inherent information, which is inherent to the image forming apparatus and is stored in the inherent information storage. The encryptor encrypts the image data read by the image reader based on the encryption key generated by the encryption key generator to generate the encryption data. The decryption key generator generates the decryption key based on the inherent information stored in the inherent information storage, if the image formation designation to form an image on a recording sheet is accepted by the acceptor. The decryptor decrypts the encryption data based on the decryption key generated by the decryption key generator to acquire the image data. The image forming section forms the image on the recording sheet based on the image data acquired by the decryptor. In this arrangement, even if an image formation is attempted by decrypting the encryption data, with use of an image forming apparatus other than the image forming apparatus used in reading the image data from the document, the decryption key generated by the other image forming apparatus does not coincide with the encryption key generated by the image forming apparatus used in reading the image data from the document, because the decryption key is generated based on the inherent information different from the inherent information used in generation of the encryption key. Thus, accurate decryption of the image data read from the document with use of the decryption key is disabled. Consequently, image formation concerning the image data acquired from the document is disabled by the image forming apparatus other than the image forming apparatus used in reading the image data from the document. This arrangement enables to suppress leak of the image data acquired from the document.

An image forming system according to another aspect of the invention comprises the aforementioned image forming apparatus, and a terminal device connected to the image forming apparatus via a network for data communication, wherein the terminal device includes: a terminal storage for storing the encryption data sent from the image forming apparatus via the network; a terminal acceptor for accepting an image formation designation to form an image on a recording sheet; and a terminal controller for sending the image formation designation and the encryption data stored in the terminal storage to the image forming apparatus via the network if the image formation designation is accepted by the terminal acceptor.

In the above-mentioned image forming system, the encryption data is sent to the terminal device via the network, and is stored in the terminal storage of the terminal device. If the image formation designation is accepted by the terminal acceptor, the image formation designation and the encryption data stored in the terminal storage are sent to the image forming apparatus via the network. Further, the encryption data sent from the terminal device to the image forming apparatus via the network is decrypted by using the decryption key generated based on the inherent information of the image forming apparatus. This makes it impossible to accurately form an image concerning the image data acquired from the document if the encryption data is sent from the terminal device to an image forming apparatus other than the image forming apparatus used in reading the image data from the document. This arrangement enables to suppress leak of the image data acquired from the document.

These and other objects, features and advantages of the present invention will become more apparent upon reading the following detailed description along with the accompanying drawing.

DETAILED DESCRIPTION OF THE PREFERRED EMBODIMENTS

Figure 1:
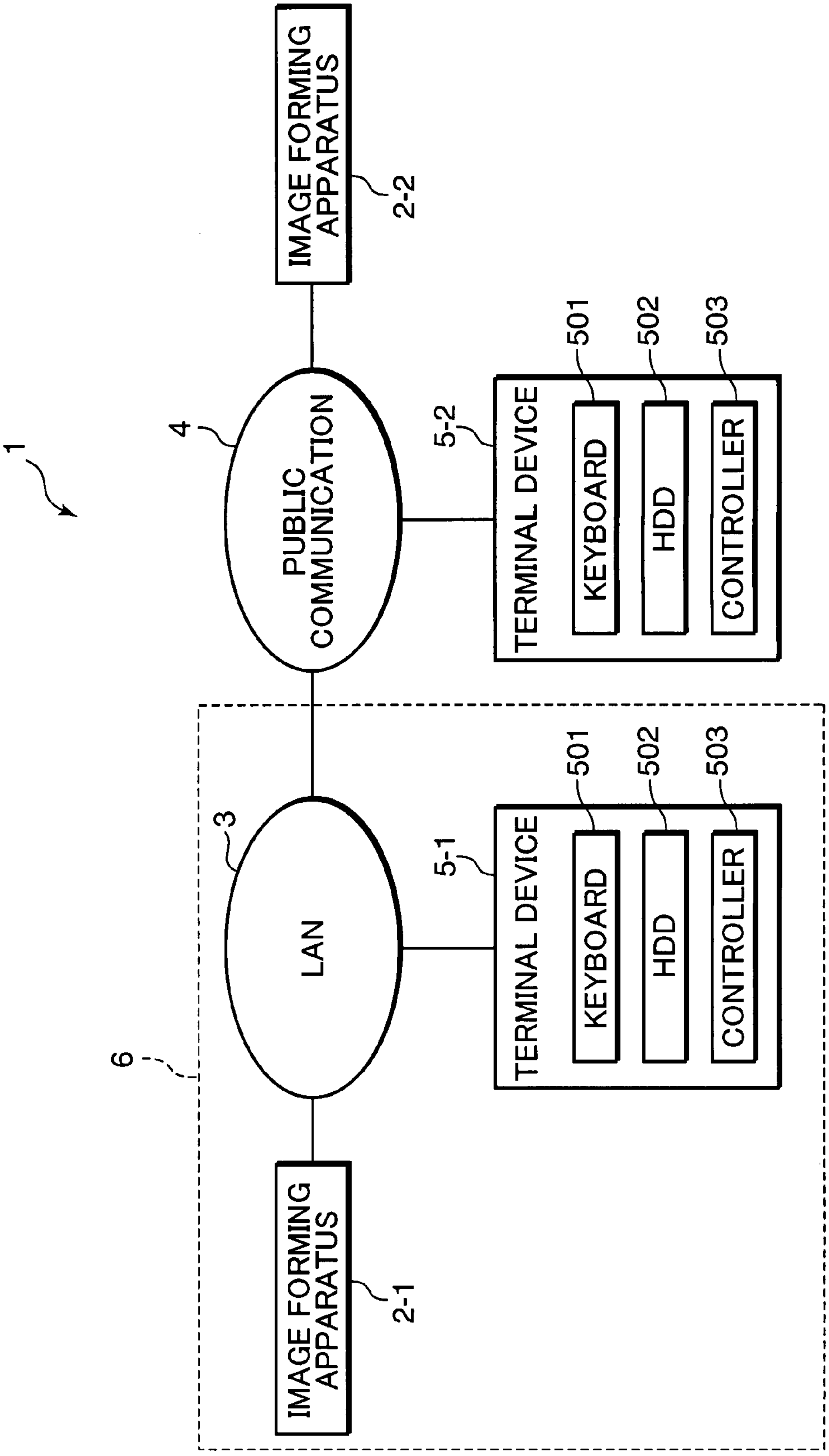
FIG. 1 is a block diagram showing an example of a configuration of an image forming system embodying the invention.

In the following, an embodiment of the invention is described referring to the drawings. Elements with identical reference numerals throughout the drawings have identical constructions, and accordingly, repeated description thereof will be omitted herein. FIG. 1 is a block diagram showing an example of a configuration of an image forming system according to the embodiment of the invention. The image forming system 1 shown in FIG. 1 includes image forming apparatuses 2-1 and 2-2 embodying the invention, an LAN (Local Area Network) 3 and a public communication line 4 as an example of a network, and terminal devices 5-1 and 5-2. In the following description, the image forming apparatuses 2-1 and 2-2, and the terminal devices 5-1 and 5-2 are respectively called as the image forming apparatus 2, and the terminal device 5 without the subclass indications when referred to as a general device; and are respectively called as the image forming apparatuses 2-1 and 2-2, and the terminal devices 5-1 and 5-2 with the subclass indications when referred to as individual devices.

The image forming apparatus 2-1 is connected to the terminal device 5-1 via the LAN 3. The LAN 3 is connected to the public communication line 4, and the public communication line 4 is connected to the image forming apparatus 2-2 and to the terminal device 5-2. The image forming apparatuses 2-1 and 2-2, and the terminal devices 5-1 and 5-2 are interactively connected by the LAN 3 and the public communication line 4 for data communication.

The image forming apparatus 2-1, the LAN 3, and the terminal device 5-1 are installed in a site e.g. in an office 6, where security administration concerning classified documents is performed. The public communication line 4 is a network such as the Internet or a telephone line. The image forming apparatus 2-2 and the terminal device 5-2 connected to the public communication line 4 are installed in a site other than the office 6, where security administration concerning classified documents is not performed.

Figure 2:
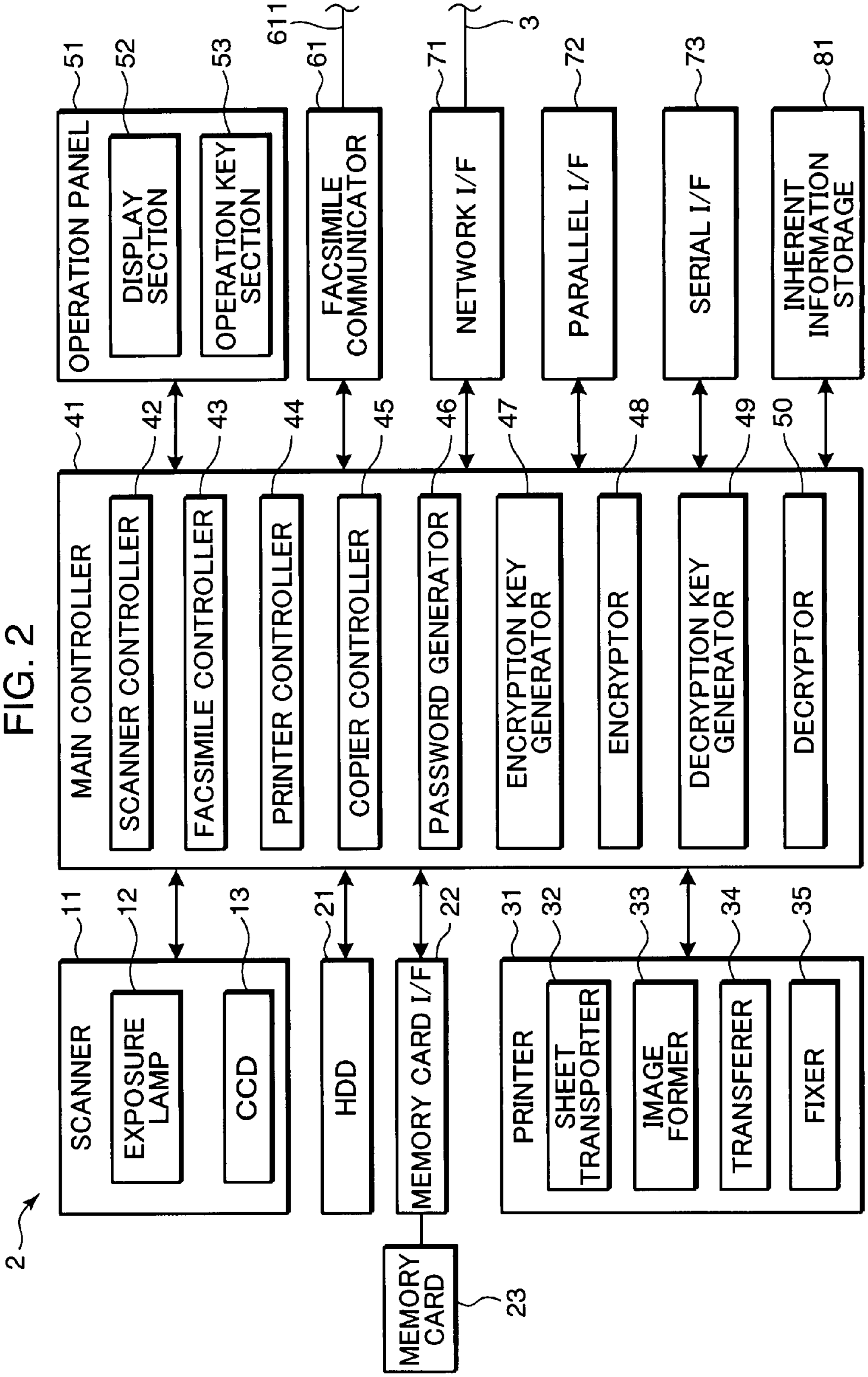
FIG. 2 is a block diagram showing an example of a configuration of an image forming apparatus embodying the invention.

FIG. 2 is a block diagram showing an example of a configuration of the image forming apparatus 2 embodying the invention. The image forming apparatus 2 shown in FIG. 2 is a complex machine provided with image-formation-related functions such as a copying function, a printing function, a facsimile function, and a scanning function.

The image forming apparatus 2 includes a scanner 11 as an image reader, an HDD 21 as a storage, a memory card I/F 22 as a storage controller, a printer 31 as an image forming section, a main controller 41, an operation panel 51 as an acceptor, a facsimile communicator 61, a network I/F 71 as an acceptor and a storage controller, a parallel I/F 72, a serial I/F 73, and an inherent information storage 81.

The scanner 11, the HDD 21, the main controller 41, the operation panel 51, and the network I/F 71 are operative to realize a network scanning function of encrypting the acquired image data to transmit the encrypted data to a predetermined mail address as an e-mail, or of directly transmitting the encrypted data to an IP address. The scanner 11, the HDD 21, the printer 31, the main controller 41, the operation panel 51, and the facsimile communicator 61 are operative to realize a facsimile function. The HDD 21, the printer 31, the main controller 41, the operation panel 51, the network I/F 71, and the parallel I/F 72 are operative to realize a printing function. The scanner 11, the HDD 21, the printer 31, the main controller 41, and the operation panel 51 are operative to realize a copying function.

The operation panel 51 is adapted for a user to perform operations concerning the various functions such as the copying function, the printing function, the facsimile function, and the scanning function. The operation panel 51 is adapted to accept an operation designation by the user e.g. an image formation designation to print information stored in e.g. the HDD 21 so as to issue the operation designation to the main controller 41. The operation panel 51 includes a display section 52 provided with a touch panel, and an operation key section 53 provided with a start key and a ten key.

The display section 52 includes a touch panel unit provided with the touch panel and an LCD (Liquid Crystal Display) for image display. The display section 52 is adapted to display various operation screen images, and to accept an input operation. For instance, in executing the facsimile function, the display section 52 displays information relating to selection of users, selection of recipients, setting concerning transmission, and the like, and displays an operation button or a like indication for allowing the user to enter various operation designations by touching a relevant portion. The operation key section 53 accepts various designation inputs by the user such as a designation to start copying or a designation to start facsimile transmission.

The scanner 11 is adapted to generate image data by optically acquiring a document image. The scanner 11 includes an exposure lamp 12 and a CCD (charge coupled device) 13. The scanner 11 is operated in such a manner that the exposure lamp 12 irradiates light onto a document, the CCD 13 receives light reflected from the document to read a document image, and image data corresponding to the read image is outputted to the main controller 41. The scanner 11 may be operative to read a color image or a photographic image of a document, in addition to a monochromatic image.

The HDD 21 corresponds to an example of a storage for storing image data of a document encrypted by e.g. the main controller 41. The memory card I/F 22 is an interface circuit adapted for storing data in a memory card 23 or reading the data from the memory card 23 by inserting or contacting the memory card 23. The memory card 23 is provided in various forms in conformity with the specifications defined by the PCMCIA (Personal Computer Memory Card International Association) or the SDA (SD Card Association). In this embodiment, the memory card I/F 22 corresponds to an example of a storage controller for storing image data of a document encrypted in the memory card. The storage medium may not be limited to the memory card. Various storage media such as an FD (Flexible Disk) and a CD-R (Compact Disc-Recordable) may be used. An interface circuit compatible with the storage media may be provided as the storage controller, in place of the memory card I/F 22.

The printer 31 is adapted to acquire, from the main controller 41, image data such as image data of a document read by the scanner 11, image data received from an external personal computer or a like device via the network I/F 71, or fax data received from an external facsimile machine by the facsimile communicator 61 to print an image corresponding to the image data onto a predetermined recording sheet.

The printer 31 is an electrophotographic image forming section including: a sheet transporter 32 provided with e.g. a sheet cassette and a sheet feeding roller; an image former 33 provided with an intermediate transfer roller, a photosensitive drum, an exposure device, and a developing device; a transferer 34 provided with a transfer roller; and a fixer 35 provided with a fixing roller. Specifically, the sheet transporter 32 is adapted to transport a recording sheet to the image former 33, which, in turn, forms a toner image corresponding to the image data. The transferer 34 is adapted to transfer the toner image onto the recording sheet. The fixer 35 is adapted to fix the toner image on the recording sheet, whereby an image is formed.

The printer 31 is not limited to the electrophotographic image forming section for forming an image by using a toner. Alternatively, various processes may be applied, including e.g. an ink jet printing process of forming an image by ejecting an ink onto a recording sheet, and a thermal transfer process of transferring an image to a recording sheet by heating an ink film.

The facsimile communicator 61 includes an encoder/decoder (not shown), a modulator/demodulator (not shown), and an NCU (Network Control Unit) (not shown). The facsimile communicator 61 is adapted to send image data of a document read by the scanner 11 to another facsimile machine via a communication line 611 such as a telephone line or an Internet line, or to receive image data sent from another facsimile machine. The encoder/decoder is adapted to compress/encode image data to be transmitted, and to decompress/decode received image data. The modulator/demodulator is adapted to modulate the compressed/encoded image data to an audio signal, or to demodulate the received signal (audio signal) to image data. The NCU controls connection with a facsimile machine as a recipient by way of a telephone line.

The network I/F 71 is adapted to control communication of various data with the terminal device 5 connected to the image forming apparatus 2 via the LAN 3, using a network interface (e.g. 10/100 base-TX). For instance, the network I/F 71 is operative to send, to the terminal device 5, document image data that has been read by the scanner 11 and encrypted by the main controller 41, as an e-mail, or to receive image data sent from the terminal device 5 for printing by the printer 31.

The parallel I/F 72 is adapted to receive data to be printed or the like from an external device by parallel transmission of sending data in the unit of bits, using plural signal lines, with use of a high-speed interactive parallel interface (e.g. in conformity with IEEE1284) or a like interface. The serial I/F 73 is adapted to receive various data or the like from the external device or a like device by serial transmission of sequentially sending data one bit by one bit, using a single signal line, with use of a serial interface (e.g. RS-232C) or a like interface.

The inherent information storage 81 is a storage, in which inherent information inherent to the image forming apparatus 2 is stored in advance, and includes e.g. an EEPROM (Electrically Erasable and Programmable Read Only Memory). The inherent information is made different among the image forming apparatus 2 concerning e.g. the manufacturing number, the serial number, or the like of the image forming apparatus 2. For instance, the inherent information stored in the inherent information storage 81 of the image forming apparatus 2-1 is different from that of the image forming apparatus 2-2.

The main controller 41 includes an unillustrated CPU (Central Processing Unit), an ROM (Read Only Memory) for storing a predetermined control program, and a RAM (Random Access Memory) for temporarily storing data, as well as peripheral devices thereof. With this arrangement, the main controller 41 controls an overall operation of the image forming apparatus 2 in accordance with the designation information accepted by the operation panel 51 or a like device, or detection signals from sensors provided at appropriate positions of the image forming apparatus 2. Specifically, the main controller 41 functions as a scanner controller 42, a facsimile controller 43, a printer controller 44, a copier controller 45, a password generator 46, an encryption key generator 47, an encryptor 48, a decryption key generator 49, and a decryptor 50, by executing the control program stored in the ROM. The control program may be executed by the CPU by storing the control program in a non-volatile and large-capacity external storage device such as an HDD 74, and by transferring the control program to a primary storage device such as the RAM according to needs.

The scanner controller 42 controls operations of the relevant elements to be used in realizing the scanning function. The facsimile controller 43 controls operations of the relevant elements to be used in realizing the facsimile function. In executing facsimile transmission, the facsimile controller 43 controls the facsimile communicator 61 to directly transmit the image data of the document read by the scanner 11 to a facsimile machine or a like device via the communication line 611 by designating a telephone number stored in the HDD 21.

The printer controller 44 controls operations of the relevant elements to be used in realizing the printing function. The copier controller 45 controls operations of the relevant elements to be used in realizing the copying function.

The password generator 46 generates a new password each time image data is read from a document by the scanner 11 to output the password to the encryption key generator 47. The password generator 46 changes the password by generating a new password, using information which periodically or irregularly changes with a certain frequency, such as current time information or date information acquired using an unillustrated RTC (Real Time Clock), or the counted number obtained by accumulatively counting the number of recording sheets for which image formation has been executed by the printer 31, using an unillustrated output sheet counter. For instance, in the case where the password generator 46 generates a new password by using the date information, the password is changed every day. For instance, in the case where the password generator 46 generates a new password by using the output sheet counter, the password is changed each time an image formation is executed by the image forming apparatus 2. Thus, a newly generated password is changed substantially every predetermined time interval depending on the frequency of image formation.

Alternatively, the password generator 46 may use a random number generated by using a well-known random number generating circuit or an equivalent circuit, as a password. The password is provided to improve encryption security of image data encrypted by the encryptor 48. Accordingly, as far as the password is changeable with such a frequency as to satisfy a required encryption security, a new password may not be generated each time the password is generated.

The encryption key generator 47 generates an encryption key, based on the inherent information stored in the inherent information storage 81, and the password generated by the password generator 46. For instance, the password generator 46 generates an encryption key by performing various computations such as multiplication or addition, using the inherent information and the password. The password is provided to improve encryption security of image data encrypted by the encryptor 48. In view of this, the encryption key generator 47 may generate an encryption key solely based on the inherent information stored in the inherent information storage 81, without using the password.

The encryptor 48 generates encryption data by encrypting the image data read by the scanner 11, using the encryption key generated by the encryption key generator 47 to store the encryption data in the HDD 21 or in the memory card 23 connected to the memory card I/F 22. The encryptor 48 may use various encryption schemes including DES (Data Encryption Standard) and AES (Advanced Encryption Standard), as the encryption scheme.

The decryption key generator 49 acquires the password from the encryption data stored in the HDD 21 or in the memory card 23 connected to the memory card I/F 22 in response to acceptance of an image formation designation by the operation panel 51 to generate a decryption key by using the acquired password and the inherent information stored in the inherent information storage 81.

The decryptor 50 decrypts the encryption data stored in the HDD 21 or in the memory card 23 connected to the memory card I/F 22 based on the decryption key generated by the decryption key generator 49 to acquire the image data, and to output the acquired image data to the printer 31 for image formation.

The terminal device 5 shown in FIG. 1 is in the form of e.g. a personal computer. For instance, the terminal device 5 includes an unillustrated display device, a keyboard 501 as a terminal acceptor, an HDD 502 as a terminal storage, and a controller 503 provided with a CPU, as a terminal controller. The controller 503 is operative to acquire the encryption data stored in the HDD 21 of the image forming apparatus 2 via the LAN 3 and the public communication line 4 for storing the encryption data in the HDD 502; and to send an image formation designation, and the encryption data stored in the HDD 502 to the image forming apparatus 2 via the LAN 3 and the public communication line 4 in response to acceptance of the image formation designation by the keyboard 501, by executing a control program stored in the HDD 502.

Figure 3:
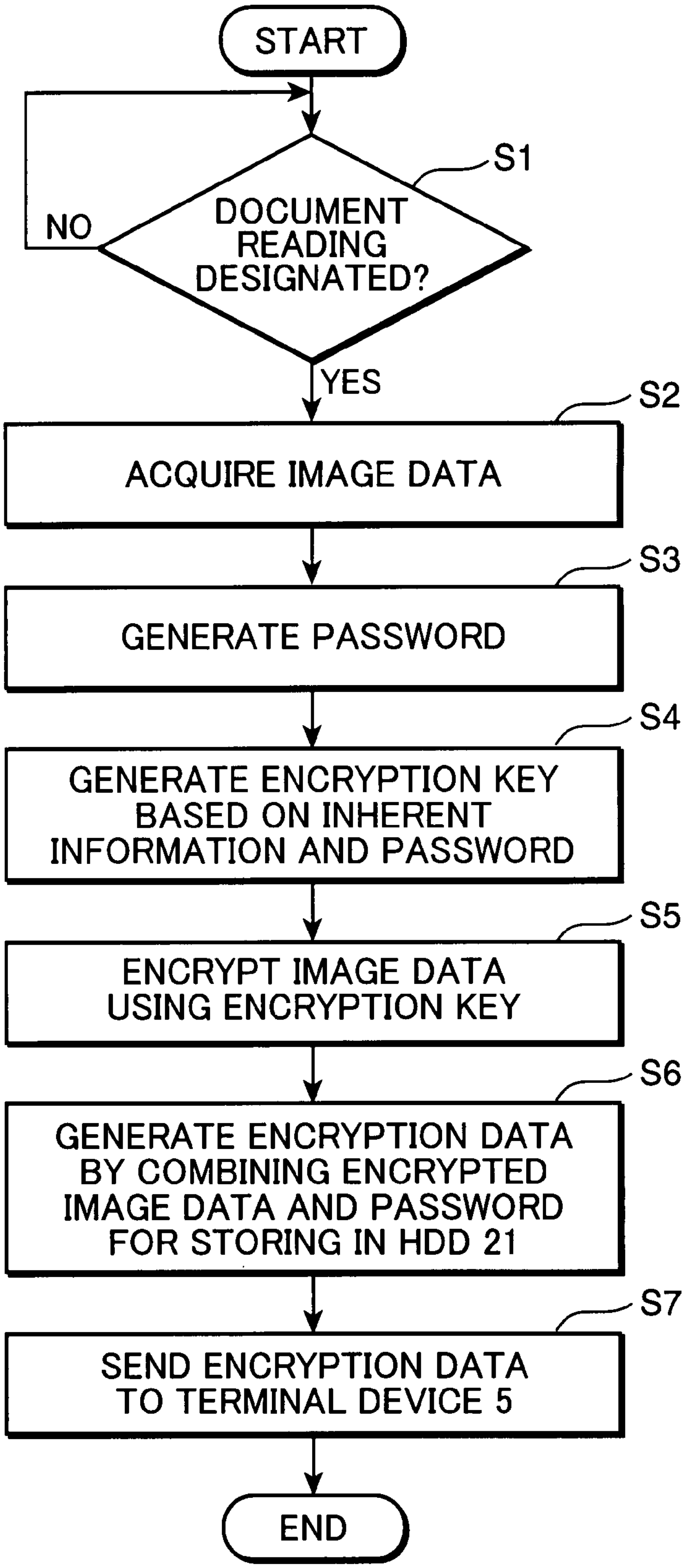
FIG. 3 is a flowchart showing an example of an operation of the image forming apparatus to be executed in reading a document image.

Now, an operation of the image forming apparatus 2 having the above arrangement is described. FIG. 3 is a flowchart showing an example of an operation of the image forming apparatus 2 to be executed in reading a document image. In the following, description is made based on an example that an image of a classified document is read by using the image forming apparatus 2-1 installed in the office 6. First, in response to a user's manipulation of the operation panel 51, the operation panel 51 is operated to accept a designation of reading a document image (YES in Step S1). Then, the scanner 11 is operated to read image data of the document in accordance with a control signal from the scanner controller 42, and the read document image data is temporarily stored in e.g. the RAM provided in the main controller 41 (Step S2).

Then, the password generator 46 generates a password (Step S2). For instance, the password generator 46 generates "060411" as a password, based on date information "Jun. 4, 2011" obtained by the unillustrated RTC (Step S3). Then, the encryption key generator 47 reads a serial number stored in the inherent information storage 81 e.g. the number "12345", and generates an encryption key "12345060411" by adding the serial number "12345" to the password "060411".

Figure 4:
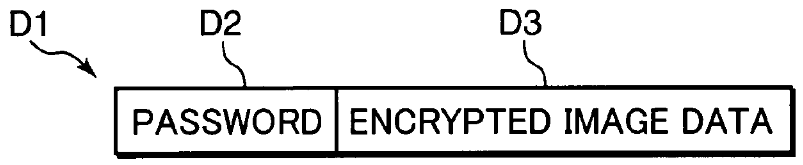
FIG. 4 is an explanatory diagram showing an example of a data structure of encryption data.

Then, the encryptor 48 encrypts the document image data temporarily stored in the RAM by using the encryption key "12345060411" (Step S5). Then, the encryptor 48 combines the encrypted image data and the password "060411", and stores the combined data as encryption data D1 in the HDD 21 (Step S6). FIG. 4 is an explanatory diagram showing an example of a data structure of the encryption data D1. As shown in FIG. 4, the encryption data D1 is combined data, in which e.g. encrypted image data D3 is attached, following a password D2. As far as the password D2 is acquirable from the encryption data D1, various methods for combining the password D2 and the image data D3 may be used. For instance, the password D2 may be attached, following the image data D3, or the password D2 may be embedded in a predetermined position of the image data D3.

Then, the encryption data D1 stored in the HDD 21 is transmitted to e.g. the terminal device 5-2 by the network I/F 71 via the LAN 3 and the public communication line 4 in accordance with e.g. a control signal from the scanner controller 42 (Step S7). Then, the routine is ended.

In the above arrangement, in the case where the terminal device 5 to which the encryption data D1 is sent is the terminal device 5-1 installed in the office 6, the encryption data D1 is administered in the office 6 where security administration concerning classified documents is provided. Accordingly, there is no likelihood that security administration-related problems may occur. However, the terminal device 5-2 is installed outside the office 6 i.e. in a site where security administration is not provided. Accordingly, there is a possibility that a third party who is not authorized to access the classified document whose image has been read by the scanner 11 may access the encryption data D1, using the terminal device 5-2. However, since the encryption data D1 has been encrypted, even if the third party has accessed the encryption data D1, he or she fails to decrypt the encryption data D1. Thus, the above arrangement enables to suppress leak of security.

Figure 5:
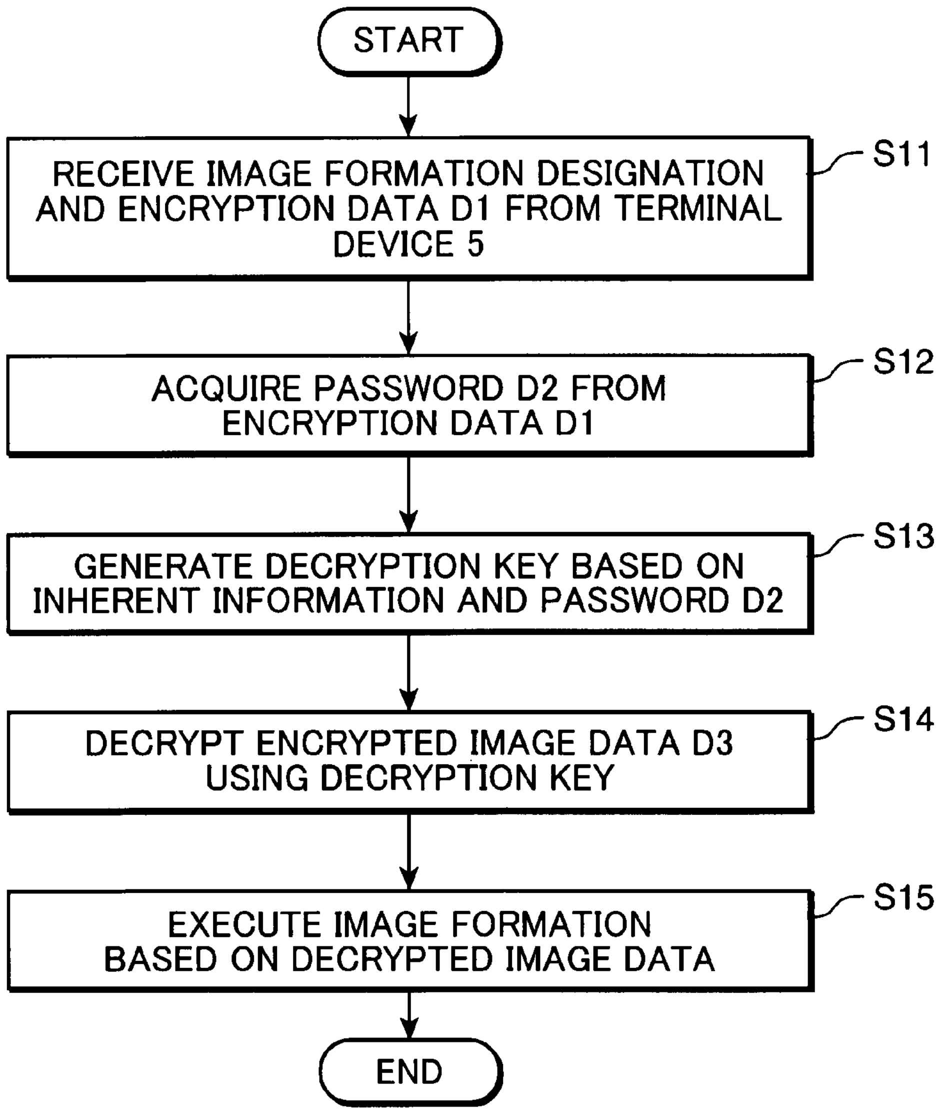
FIG. 5 is a flowchart showing an example of an image forming process to be executed based on encryption data.

Next, description is made on a case that the image forming apparatus 2-1 identical to an image forming apparatus used in reading image data from a document performs an image formation based on the encryption data stored in the HDD 502 of the terminal device 5-2. FIG. 5 is a flowchart showing an example of an image forming process to be executed based on encryption data. First, in the case where an image formation designation to perform an image formation by the image forming apparatus 2-1 is accepted by the keyboard 501 or an unillustrated mouse of the terminal device 5-2, the controller 503 of the terminal device 5-2 is operated to send, to the image forming apparatus 2-1, the image formation designation, and the encryption data D1 stored in the HDD 502 via the public communication line 4 and the LAN 3. Then, the image forming apparatus 2-1 receives, by way of the network I/F 71, the image formation designation and the encryption data D1 sent from the terminal device 5-2 for storing in e.g. the HDD 21 (Step S11). In this embodiment, the network I/F 71 corresponds to an example of an acceptor.

Then, the decryption key generator 49 retrieves and acquires the password D2 e.g. the number "060411" from the encryption data D1 stored in the HDD 21 (Step S12). Then, the decryption key generator 49 generates a decryption key "12345060411", which is identical to the encryption key used in encrypting the image data D3, based on the inherent information of the image forming apparatus 2-1 stored in the inherent information storage 81 e.g. the serial number "12345", and the password "060411" (Step S13).

Then, the decryptor 50 acquires the encrypted image data D3 from the encryption data D1 stored in the HDD 21 to decrypt the image data D3 by using the decryption key "12345060411" (Step S14). Then, an image is formed on a recording sheet based on the decrypted image data in accordance with a control signal from the printer controller 44 (Step S15).

By implementing the aforementioned operation, the decryption key is generated by the image forming apparatus 2-1 identical to the image forming apparatus used in reading the image data from the classified document and generating the encryption data D1. Thus, the inherent information used in generation of the encryption key, and the inherent information used in generation of the decryption key are made identical to each other, and the decryption key identical to the encryption key is obtained. This enables to accurately decrypt the image data of the classified document, and to form the image acquired from the classified document on a recording sheet.

The foregoing embodiment describes an example, in which the image forming apparatus 2 is operated in such a manner that the encryption data D1 is stored in the terminal device 5 connected to the image forming apparatus 2 via the network, and the encryption data D1 is received from the terminal device 5 via the network for decryption. Alternatively, the image forming apparatus 2 may be configured in such a manner that the encryption data D1 is stored in e.g. the HDD 21 or in the memory card 23 connected to the memory card I/F 22, and thereafter, the encryption data D1 read out from the HDD 21 or the memory card 23 is decrypted by the image forming apparatus 2 storing the encryption data D1. In the modification, the inherent information used in generation of the encryption key, and the inherent information used in generation of the decryption key are also made identical to each other, and the decryption key identical to the encryption key is obtained. This enables to accurately decrypt the image data of the classified document, and to form an image acquired from the classified document to a recording sheet.

Next, description is made on a case that the image forming apparatus 2-2 different from the image forming apparatus 2-1 used in reading image data from a document performs an image formation based on the encryption data stored in the HDD 502 of the terminal device 5-2. In this case, the inherent information of the image forming apparatus 2-1 and the inherent information of the image forming apparatus 2-2 are different from each other, and the inherent information of the image forming apparatus 2-2 is e.g. the serial number "98765". In this case, in Step S13 of FIG. 5, the decryption key generator 49 generates a decryption key "98765060411", which is different from the encryption key used in encryption of the image data D3.

Then, in Step S14, the decryptor 50 decrypts the image data D3, using the decryption key "98765040611", which is different from the encryption key used in encrypting the image data D3. As a result, the image data of the classified document cannot be accurately decrypted. Therefore, in Step S15, an image different from the image acquired from the classified document is formed on a recording sheet. Thus, the arrangement enables to eliminate likelihood that an image obtained from a classified document may be formed on a recording sheet by the image forming apparatus 2-2 installed outside the office 6, thereby suppressing leak of security.

In the embodiment, there is no need of the user's entering a password in forming an image concerning a classified document, unlike the image forming apparatus according to the background art. This enables to eliminate likelihood that the password may be known to a third party, thereby suppressing leak of security. Also, since there is no need of the user's entering a password in forming an image concerning a classified document, the operation required for the user in forming the image by the image forming apparatus 2 can be simplified, thereby enhancing operability of the user.

Further, the password D2 for decrypting the image data D3 is periodically or irregularly changed with a certain frequency. This enhances encryption security of the image data D3, thereby reducing leak of security.

In the case where the memory card 23 storing the encryption data D1 in the image forming apparatus 2-1 is connected to the memory card I/F 22 provided in the image forming apparatus 2-2 installed outside the office 6, where security administration is not provided, and the image forming apparatus 2-2 performs an image formation based on the encryption data D1 stored in the memory card 23, or in the case where the HDD 21 storing the encryption data D1 in the image forming apparatus 2-1 is detached from the image forming apparatus 2-1 and attached to the image forming apparatus 2-2, and an image formation is performed by the image forming apparatus 2-2 based on the encryption data D1 stored in the HDD 21, an image different from the image obtained from the classified document is formed on a recording sheet by the image forming apparatus 2-1, by implementing steps substantially identical to Steps S13 through S15. Thus, the arrangement enables to eliminate likelihood that an image obtained from a classified document may be formed on a recording sheet by the image forming apparatus 2-2 installed outside the office 6, thereby suppressing leak of security.

As mentioned, above, an image forming apparatus according. to an aspect of the invention comprises: an image reader for reading image data from a document; an inherent information storage for storing inherent information inherent to the image forming apparatus in advance; an encryption key generator for generating an encryption key based on the inherent information stored in the inherent information storage; an encryptor for encrypting the image data read by the image reader based on the encryption key generated by the encryption key generator to generate encryption data; an acceptor for accepting an image formation designation to form an image on a recording sheet; a decryption key generator for generating a decryption key based on the inherent information stored in the inherent information storage if the image formation designation is accepted by the acceptor; a decryptor for decrypting the encryption data based on the decryption key generated by the decryption key generator to acquire the image data; and an image forming section for forming the image on the recording sheet based on the image data acquired by the decryptor.

In the above-mentioned image forming apparatus, the image reader reads the image data from the document, and the encryption key generator generates the encryption key based on the inherent information, which is inherent to the image forming apparatus and is stored in the inherent information storage. The encryptor encrypts the image data read by the image reader based on the encryption key generated by the encryption key generator to generate the encryption data. The decryption key generator generates the decryption key based on the inherent information stored in the inherent information storage, if the image formation designation to form an image on a recording sheet is accepted by the acceptor. The decryptor decrypts the encryption data based on the decryption key generated by the decryption key generator to acquire the image data. The image forming section forms the image on the recording sheet based on the image data acquired by the decryptor. In this arrangement, even if an image formation is attempted by decrypting the encryption data, with use of an image forming apparatus other than the image forming apparatus used in reading the image data from the document, the decryption key generated by the other image forming apparatus does not coincide with the encryption key generated by the image forming apparatus used in reading the image data from the document, because the decryption key is generated based on the inherent information different from the inherent information used in generation of the encryption key. Thus, accurate decryption of the image data read from the document with use of the decryption key is disabled. Consequently, image formation concerning the image data acquired from the document is disabled by the image forming apparatus other than the image forming apparatus used in reading the image data from the document. This arrangement enables to suppress leak of the image data acquired from the document.

Preferably, the image forming apparatus may further comprise a password generator for generating a password, wherein the encryption key generator generates the encryption key based on the inherent information stored in the inherent information storage and the password generated by the password generator, the encryptor combines the encrypted image data and the password generated by the password generator to generate the encryption data, and the decryption key generator acquires the password from the encryption data, if the image formation designation is accepted by the acceptor, to generate the decryption key based on the acquired password and the inherent information stored in the inherent information storage In the above arrangement, the password generator generates the password, and the encryption key generator generates the encryption key based on the password and the inherent information. The encryptor combines the encrypted image data, and the password generated by the password generator to generate the encryption data. The decryption key generator acquires the password from the encryption data, if the image formation designation is accepted by the acceptor, to generate the decryption key based on the acquired password and the inherent information. This arrangement enables to enhance encryption security because the image data is encrypted by using the encryption key generated using the password and the inherent information.

Preferably, the password generator may change the password every predetermined time interval. In this arrangement, the password used in generation of the encryption key is changed every predetermined time interval. This enables to increase difficulty in decryption, and to enhance encryption security.

Preferably, the password generator may change the password each time the image data is read from the document by the image reader. In this arrangement, the password used in generation of the encryption key is changed each time the image data is read from the document by the image reader. This enables to increase difficulty in decryption, and to enhance encryption security.

Preferably, the image forming apparatus may further comprise a storage for storing the encryption data generated by the encryptor. In this arrangement, the encryptor encrypts the image data read by the image reader using the generated encryption key based on the inherent information inherent to the image forming apparatus, and the storage stores the encryption data. Consequently, image formation concerning the image data stored in the storage is disabled by the image forming apparatus other than the image forming apparatus used in reading the image data from the document. This arrangement enables to suppress leak of the image data acquired from the document.

Preferably, the image forming apparatus may further comprise a storage controller which is so configured as to enable data communication with a terminal device connectable to the image forming apparatus via a network, and the storage controller may be operative to store the encryption data in the terminal device by sending the encryption data to the terminal device via the network, and to acquire the encryption data by receiving the encryption data from the terminal device via the network.

In the above arrangement, the encryption data is sent from the image forming apparatus to the terminal device via the network, and is stored in the terminal device. Then, the encryption data sent from the terminal device to the image forming apparatus via the network is decrypted by using the decryption key generated based on the inherent information of the image forming apparatus. With this arrangement, if the encryption data is sent to an image forming apparatus other than the image forming apparatus used in reading the image data from the document, accurate image formation concerning the image data acquired from the document is disabled. This arrangement enables to suppress leak of the image data acquired from the document.

An image forming system according to another aspect of the invention comprises the aforementioned image forming apparatus, and a terminal device connected to the image forming apparatus via a network for data communication, wherein the terminal device includes: a terminal storage for storing the encryption data sent from the image forming apparatus via the network; a terminal acceptor for accepting an image formation designation to form an image on a recording sheet; and a terminal controller for sending the image formation designation and the encryption data stored in the terminal storage to the image forming apparatus via the network if the image formation designation is accepted by the terminal acceptor.

In the above-mentioned image forming system, the encryption data is sent to the terminal device via the network, and is stored in the terminal storage of the terminal device. If the image formation designation is accepted by the terminal acceptor, the image formation designation and the encryption data stored in the terminal storage are sent to the image forming apparatus via the network. Further, the encryption data sent from the terminal device to the image forming apparatus via the network is decrypted by using the decryption key generated based on the inherent information of the image forming apparatus. This makes it impossible to accurately form an image concerning the image data acquired from the document if the encryption data is sent from the terminal device to an image forming apparatus other than the image forming apparatus used in reading the image data from the document. This arrangement enables to suppress leak of the image data acquired from the document.

This application is based on Japanese Patent Application No. 2006-138064 filed on May 17, 2006, the contents of which are hereby incorporated by reference.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included therein.

What is claimed is:

1. An image forming apparatus, comprising:

an image reader for reading image data from a document;

an inherent information storage for storing inherent information inherent to the image forming apparatus in advance;

an encryption key generator for generating an encryption key based on the inherent information stored in the inherent information storage without communicating to the outside of the image forming apparatus;

an encryptor for encrypting the image data read by the image reader based on the encryption key generated by the encryption key generator to generate encryption data;

an acceptor for accepting an image formation designation to form an image on a recording sheet;

a decryption key generator for generating a decryption key based on the inherent information stored in the inherent information storage if the image formation designation is accepted by the acceptor;

a decryptor for decrypting the encryption data based on the decryption key generated by the decryption key generator to acquire the image data; and an image forming section for forming the image on the recording sheet based on the image data acquired by the decryptor.

2. The image forming apparatus according to claim 1, further comprising:

a password generator for generating a password, wherein the encryption key generator generates the encryption key based on the inherent information stored in the inherent information storage and the password generated by the password generator, the encryptor combines the encrypted image data and the password generated by the password generator to generate the encryption data in such a manner that said password is acquirable from the encryption data, and the decryption key generator acquires the password from the encryption data, if the image formation designation is accepted by the acceptor, to generate the decryption key based on the acquired password and the inherent information stored in the inherent information storage.

3. The image forming apparatus according to claim 2, wherein the password generator changes the password every predetermined time interval.

4. The image forming apparatus according to claim 2, wherein the password generator changes the password each time the image data is read from the document by the image reader.

5. The image forming apparatus according to claim 1, further comprising:

a storage for storing the encryption data generated by the encryptor.

6. The image forming apparatus according to claim 1, further comprising:

a storage controller which is so configured as to enable data communication with a terminal device connectable to the image forming apparatus via a network, the storage controller being operative to store the encryption data in the terminal device by sending the encryption data to the terminal device via the network, and to acquire the encryption data by receiving the encryption data from the terminal device via the network.

7. An image forming system comprising:

the image forming apparatus of claim 6; and a terminal device connected to the image forming apparatus via the network for data communication, wherein the terminal device includes:

a terminal storage for storing the encryption data sent from the image forming apparatus via the network;

a terminal acceptor for accepting an image formation designation to form an image on a recording sheet; and a terminal controller for sending the image formation designation and the encryption data stored in the terminal storage to the image forming apparatus via the network if the image formation designation is accepted by the terminal acceptor.

* * * * *